(12) United States Patent
Moyer

(10) Patent No.: US 7,958,401 B2
(45) Date of Patent: Jun. 7, 2011

(54) DEBUG TRACE MESSAGING WITH ONE OR MORE CHARACTERISTIC INDICATORS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 353 days.

(21) Appl. No.: 12/179,631

(22) Filed: Jul. 25, 2008

(65) Prior Publication Data

US 2010/0023812 A1 Jan. 28, 2010

(51) Int. Cl.
*G06F 11/00* (2006.01)

(52) U.S. Cl. .......................................... 714/38; 714/49

(58) Field of Classification Search .................. 714/38, 714/45, 47, 48; 717/124, 126, 128; 712/205, 712/208; 711/207
See application file for complete search history.

(56) References Cited

U.S. PATENT DOCUMENTS

| | | | | |
|---|---|---|---|---|
| 5,127,103 A * | 6/1992 | Hill et al. | ......................... | 714/45 |
| 5,608,867 A | 3/1997 | Ishihara | | |
| 5,630,049 A * | 5/1997 | Cardoza et al. | .................. | 714/25 |
| 5,636,374 A * | 6/1997 | Rodgers et al. | ............... | 712/230 |
| 5,694,706 A * | 12/1997 | Penka | .............................. | 36/103 |
| 5,913,923 A * | 6/1999 | Dunlap et al. | ................. | 710/100 |
| 6,505,309 B1 | 1/2003 | Okabayashi et al. | | |
| 6,601,189 B1 | 7/2003 | Edwards et al. | | |
| 6,802,031 B2 | 10/2004 | Floyd et al. | | |
| 6,808,867 B2 * | 10/2004 | Doshi et al. | .................... | 430/320 |
| 6,862,694 B1 | 3/2005 | Tormey et al. | | |
| 6,883,162 B2 * | 4/2005 | Jackson et al. | ................ | 717/124 |
| 6,918,065 B1 * | 7/2005 | Edwards et al. | ............... | 714/45 |
| 6,920,586 B1 | 7/2005 | Moyer | | |
| 6,963,963 B2 | 11/2005 | Moyer | | |
| 7,287,194 B2 | 10/2007 | Moyer | | |
| 7,296,137 B2 | 11/2007 | Moyer | | |
| 7,299,335 B2 | 11/2007 | Moyer | | |
| 2002/0038437 A1 | 3/2002 | Hogdal et al. | | |
| 2002/0188831 A1 | 12/2002 | Jackson et al. | | |
| 2004/0221269 A1 | 11/2004 | Ray et al. | | |
| 2005/0138484 A1 | 6/2005 | Moyer et al. | | |

(Continued)

FOREIGN PATENT DOCUMENTS

JP 2003271417 A 9/2003

OTHER PUBLICATIONS

PCT/US2009/041211 International Search Report and Written Opinion mailed Nov. 30, 2009 on Application Corresponding to Related U.S. Appl. No. 12/179,632. Non-Final Office Action mailed Aug. 2, 2010 in U.S. Appl. No. 12/179,629.
Morigaki, Toshihiko, "Information Processing Device and Electronic Equipment," Machine English translation of JP 2003271417A, published Sep. 26, 2003, 12 pages.
U.S. Appl. No. 12/179,632, Non-Final Office Action mailed Feb. 4, 2010, 30 pages (892).
U.S. Appl. No. 12/179,629, Notice of Allowance mailed Jan. 10, 2011, 9 pages.

*Primary Examiner* — Dieu-Minh Le

(57) ABSTRACT

In a data processing system, an address associated with a processing operation is received. A modified address is generated which includes a characteristic indicator within the address at a first predetermined bit position when the characteristic indicator is of a first type or at a second predetermined bit position when the characteristic indicator is of a second type. A first value of the characteristic indicator indicates a characteristic of the address. A modified address may also be generated which includes a characteristic indicator at a first predetermined bit position when a position indicator has a first value or at a second predetermined bit position when the position indicator has a second value. Address information can then be generated from the modified address, and a debug message can be created which includes the address information.

20 Claims, 6 Drawing Sheets

U.S. PATENT DOCUMENTS

| | | |
|---|---|---|
| 2005/0257102 A1 | 11/2005 | Moyer et al. |
| 2006/0117224 A1 | 6/2006 | Wu |
| 2006/0174225 A1 | 8/2006 | Bennett et al. |
| 2006/0271919 A1 | 11/2006 | Moyer |
| 2007/0033577 A1 | 2/2007 | Arackal |
| 2007/0130119 A1* | 6/2007 | Phillips .............................. 707/3 |
| 2008/0215920 A1 | 9/2008 | Mayer et al. |
| 2010/0023735 A1 | 1/2010 | Moyer |
| 2010/0023811 A1 | 1/2010 | Moyer |

\* cited by examiner

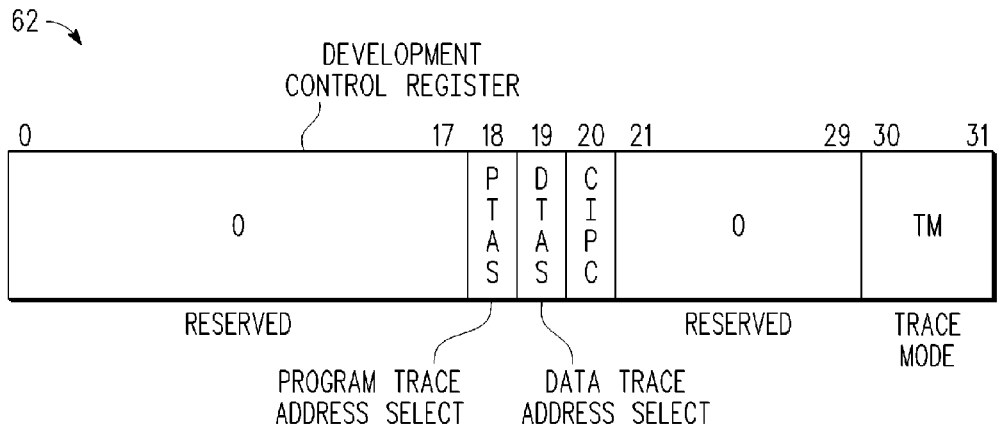

*FIG. 3*

| | | |
|---|---|---|
| DC1[18] | PTAS | PTAS – PROGRAM TRACE ADDRESS TYPE SELECT<br>0 – PROGRAM TRACE MESSAGE PROVIDE LOGICAL ADDRESSES<br>1 – PROGRAM TRACE MESSAGE PROVIDE PHYSICAL ADDRESSES |
| DC1[19] | DTAS | DTAS – DATA TRACE ADDRESS TYPE SELECT<br>0 – DATA TRACE MESSAGE PROVIDE LOGICAL ADDRESSES<br>1 – DATA TRACE MESSAGE PROVIDE PHYSICAL ADDRESSES |
| DC1[20] | CIPC | CIPC – CHARACTERISTIC INDICATOR PLACEMENT CONTROL<br>0 – ADDRESS TYPE CHARACTERISTIC INDICATOR PROVIDED<br>    AS BIT 33 OF COMPRESSED OR UNCOMPRESSED ADDRESS<br>    INFORMATION<br>1 – ADDRESS TYPE CHARACTERISTIC INDICATOR PROVIDED<br>    AS BIT 24 OF COMPRESSED OR UNCOMPRESSED ADDRESS<br>    INFORMATION |
| DC1[30:31] | TM | TM – TRACE MODE<br>00 – NO TRACE<br>1X – PROGRAM TRACE ENABLED<br>X1 – DATA TRACE ENABLED |

*FIG. 4*

```
MESSAGE GENERATION:
A1 = 0000 0000 0000 0011 1111 1100 0000 0000
A2 = 0000 0000 0000 0011 1111 0011 0110 0000

A1 ⊕ A2 = 0000 0000 0000 0000 0000 1111 0110 0000

ADDRESS MESSAGE (M1) = 1111 0110 0000

ADDRESS RE-CREATION:
A1 ⊕ M1 = A2
A1 = 0000 0000 0000 0011 1111 1100 0000 0000
M1 = 0000 0000 0000 0000 0000 1111 0110 0000
─────────────────────────────────────────────
A2 = 0000 0000 0000 0011 1111 0011 0110 0000
```

*FIG. 7*

```
PREVIOUS ADDRESS (A1) = 0x00003FC00, NEW ADDRESS (A2) = 0x10003F365
    MESSAGE GENERATION:
            ADDRESS-TYPE CHARACTERISTIC INDICATOR
    A1 = 0 0000 0000 0000 0011 1111 1100 0000 0000
    A2 = 1 0000 0000 0000 0011 1111 0011 0110 0101
                              ISA-TYPE CHARACTERISTIC INDICATOR

A1 ⊕ A2 = 1 0000 0000 0000 0000 0000 1111 0110 0101

ADDRESS MESSAGE (M1) = 1 0000 0000 0000 0000 0000 1111 0110 0101
                     - MESSAGE LENGTH = 33 BITS

ADDRESS RE-CREATION:
    A1 ⊕ M1 = A2
    A1 = 0 0000 0000 0000 0011 1111 1100 0000 0000
    M1 = 1 0000 0000 0000 0000 0000 1111 0110 0101
    ─────────────────────────────────────────────────
    A2 = 1 0000 0000 0000 0011 1111 0011 0110 0101
```

*FIG. 8*

PREVIOUS ADDRESS (A1) = 0x00003FC00, NEW ADDRESS (A2) = 0x10003F365

MESSAGE GENERATION:

ADDRESS-TYPE CHARACTERISTIC INDICATOR

A1 = 0000 0000 0 0000 0011 1111 1100 0000 0000
    A2 = 0000 0000 1 0000 0011 1111 0011 0110 0101

ISA-TYPE CHARACTERISTIC INDICATOR

A1 $\oplus$ A2 = 0000 0000 1 0000 0000 0000 1111 0110 0101

ADDRESS MESSAGE (M1) = 1 0000 0000 0000 1111 0110 0101
                  − MESSAGE LENGTH = 25 BITS

ADDRESS RE-CREATION:

A1 $\oplus$ M1 = A2
    A1 = 0000 0000 0 0000 0011 1111 1100 0000 0000
    M1 = 0000 0000 1 0000 0000 0000 1111 0110 0101
    _____
    A2 = 0000 0000 1 0000 0011 1111 0011 0110 0101

*FIG. 9*

DEBUG TRACE MESSAGING WITH ONE OR MORE CHARACTERISTIC INDICATORS

RELATED APPLICATIONS

This application is related to my copending U.S. patent applications filed of even date herewith and assigned to the assignee hereof:
(1) U.S. Serial No. 12/179,632 entitled "Debug Message Generation Using A Selected Address Type"; and
(2) U.S. Ser. No. 12/179,629 entitled "Debug Trace Messaging With One Or More Characteristic Indicators".

BACKGROUND

1. Field

This disclosure relates generally to semiconductors, and more specifically, to data processing systems that implement debug circuitry for monitoring information in the system.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system is highly desirable to remain transparent to operation of the system.

Debug messages are generated by the data processing system that contain address and data information for either program events (Program Trace Messaging), or data events (Data Read Messaging, Data Write Messaging), as well as other debug information. These messages help in the analysis and tracing of the progress of data processing in a system and are also referred to as debug trace messaging. The address information is typically virtual address information which is a format that must be translated to identify a physical memory location known as a physical address. Correlation of the address to a program undergoing execution is an important part of the debugging process so that actual program flow and the dynamic values of system data variables can be monitored. Virtual-to-physical address mapping or translation must be performed. However, an external debugger typically does not have the necessary virtual-to-physical mapping information to quickly translate the address portions of the debug messages, particularly when these mappings are dynamically changing due to demand paging or other remapping operations. The use of the virtual addresses allows a debug user a straightforward way to trace a computer program via a program listing obtained by a compile and link function which uses virtual addresses for text and data sections of the software application. The user typically has no knowledge of how the virtual addresses are translated to physical addresses by an operating system (OS). Therefore, tracing is required to indicate virtual addresses. Unfortunately certain program listings are unavailable, such as program listings for pre-compiled software modules which are executed at runtime. Examples of such modules are OS calls and library functions. In such an example, no program listing is available. Thus it is very difficult to properly trace and interpret these sections of the executed program. Correct translation of a virtual address to a physical address requires knowing where a program counter is and examining physical memory to determine where the address is. For systems executing multiple programs the memory mapping varies dynamically and readily transitions between memory pages. In such situations, the address translation significantly slows debug message generation and interpretation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates in diagram form one form of a development control register of FIG. 2;

FIG. 4 illustrates in table form exemplary encodings of control fields in the development control register of FIG. 3;

FIG. 7 illustrates in table form an example of message generation and address re-creation in accordance with one embodiment;

FIG. 8 illustrates in table form an example of message generation and address re-creation in accordance with another embodiment; and FIG. 9 illustrates in table form an example of message generation and address re-creation in accordance with yet another embodiment.

DETAILED DESCRIPTION

Figure 1:
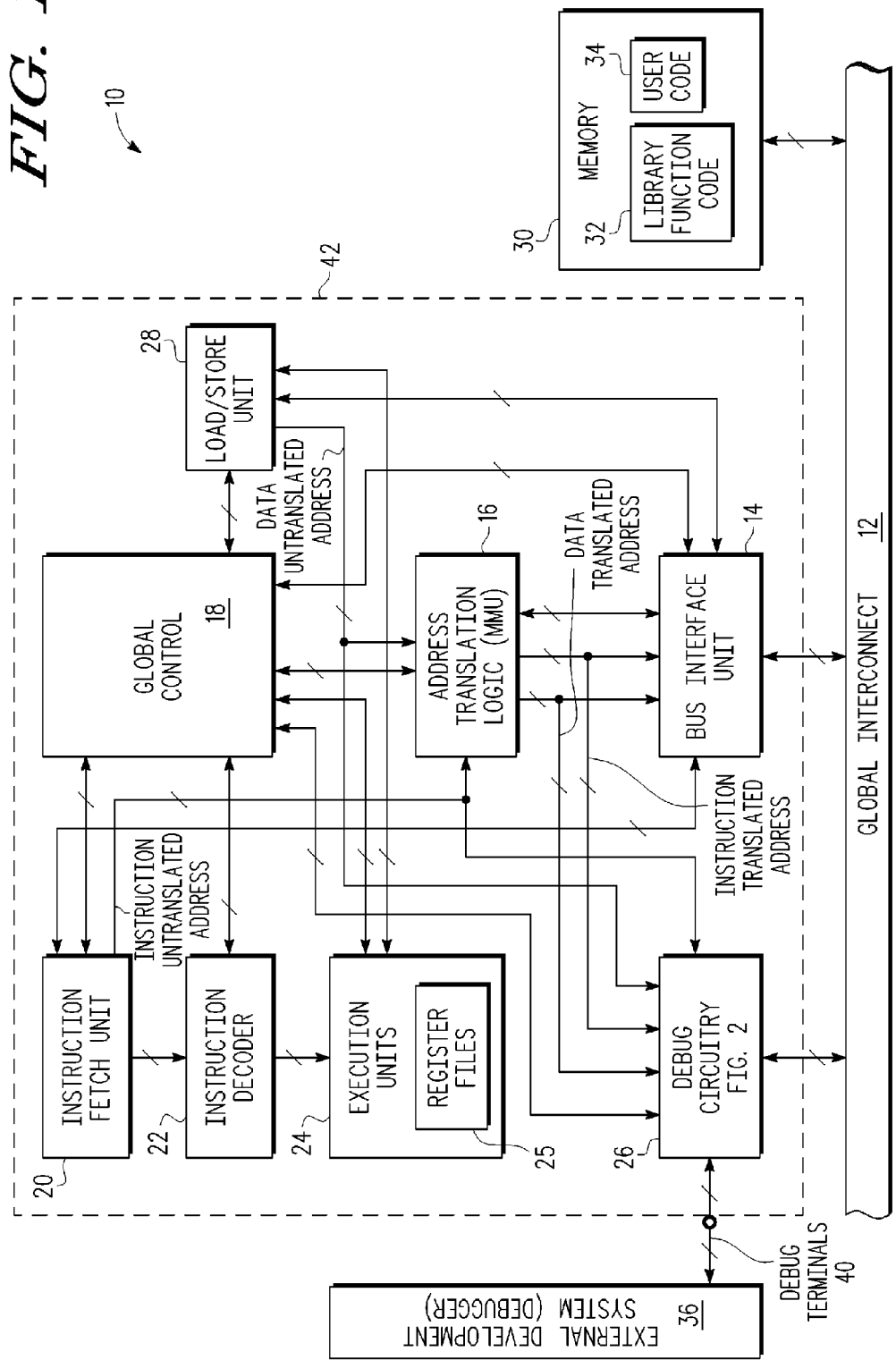
FIG. 1 illustrates in block diagram form a data processing system having debug message generation in accordance with one form of the present invention.

Illustrated in FIG. 1 is a data processing system 10 that generates debug messages having address types of a type that is dynamically selectable by user control. As used herein the term "address types" refers to various categories of address such as translated addresses versus untranslated addresses. Examples of untranslated addresses include logical addresses, virtual addresses and effective addresses. Examples of translated addresses include real addresses and physical addresses. Translated addresses may also include virtual addresses where virtual addresses have been translated from effective addresses. Within data processing system 10 is a global interconnect 12. In one form the global interconnect 12 is a system bus. Other forms of interconnect may be used including, for example, crossbars, point-to-point connections, and optical and wireless transmission techniques. A bus interface unit 14 is coupled to the global interconnect 12 via a bidirectional coupling. In one form the bidirectional coupling is a bidirectional multiple conductor bus wherein multiple conductor buses herein are represented with a slash across the conductor. The bus interface unit 14 is bidirectionally coupled to an address translation logic unit 16 which functions as a memory management unit (MMU). The address translation logic unit 16 is coupled to a first input/output terminal of a global control circuit 18 via a bidirectional multiple conductor bus. A second input/output terminal of the global control circuit 18 is coupled to a first input/output terminal of an instruction fetch unit 20 via a bidirectional multiple conductor bus. The instruction fetch unit 20 has an output coupled to an input of an instruction decoder 22 via a multiple conductor bus. An output of the instruction decoder is coupled to an input of execution units 24. In one form the execution units include at least one arithmetic logic unit, at least one floating point unit and at least one multiplier circuit. Within the execution units 24 are register files 25. An input/output terminal of instruction decoder 22 is coupled to a third input/output terminal of the global control circuit 18. An input/output terminal of execution units 24 is coupled to a fourth input/output terminal of the global control circuit 18. Debug circuitry 26 has an input/output terminal coupled to a fifth input/output terminal of the global control circuit 18. A load/store unit 28 has an input/output terminal bidirectionally coupled to a sixth input/output terminal of the global control circuit 18. The load/store unit 28 has an input coupled to a first output of the bus interface unit 14. A second output of the bus interface unit 14 is coupled to an input of the global control circuit 18. An output of the load/store unit 28 provides a data untranslated address and is coupled to a first input of the address translation logic unit 16 and a first input of the debug circuitry 26. An output of the instruction fetch unit 20 provides an instruction untranslated address and is coupled to a second input of the address translation logic unit 16 and a second input of the debug circuitry 26. A first output of the address translation logic unit 16 provides a data translated address and is coupled to a first input of the bus interface unit 14 and to a third input of the debug circuitry 26. A second output of the address translation logic unit 16 provides an instruction translated address and is coupled to a second input of the bus interface unit 14 and to a fourth input of the debug circuitry 26. A memory 30 is coupled to the global interconnect 12 via a bidirectional coupling. The memory 30 has a first portion of code that is non-user code or library function code 32. This code portion represents, for example, code for implementing specific functions or tasks and providing fixed data values. Such sets of instructions simplify work and prevent duplication of effort each time a particular task needs to be carried out. The library function code 32 prevents a programmer from having to rewrite the instructions themselves each time they are needed. The library function code 32 includes standard routines for a particular programming language. The memory 30 has a second portion of code that is user code 34 and is software provided by users of the data processing system 10. User code or programs thus differ from an operating system which runs a computer and a utility which performs maintenance or general-purpose chores. Depending upon the implementation need, user code 34 can manipulate text, numbers, graphics or a combination of these elements. Some user code offers considerable computing power by focusing on a single task such as word processing. Other user code implements less processing power but includes several applications such as, for example, word processing, spreadsheets and a database program. User code may be of any type implementing any algorithms, including real-time embedded control algorithms. Library function code 32 may also include OS code, or OS code may be located separately within memory 30 outside of library function code 32 or user code 34. The debug circuitry 26 has a second input/output terminal coupled to a plurality of debug terminals 40 via bidirectional multiple conductors. The plurality of debug terminals 40 is coupled to an external development system 36 that is commonly referred to as a debugger or external debugger. In the illustrated form the bus interface unit 14, the address translation logic unit 16, the global control circuit 18, the instruction fetch unit 20, the instruction decoder 22, the execution units 24 with register files 25, the debug circuitry and the load/store unit 28 collectively form a data processor 42 as indicated by the dashed line grouping in FIG. 1. While the global control circuit 18 is illustrated in FIG. 1 in a segregated location, it should be well understood that the circuitry and functional control of global control circuit 18 may also be implemented in a distributed manner and be included within any of the various other system blocks of data processing system 10.

In operation, the data processing system 10 communicates with devices (not shown) via the global interconnect 12. All information communicated with the data processor 42 transfers through the bus interface unit 14. The instruction fetch unit 20 retrieves data processing instructions from the bus interface unit 14 under control of the global control circuit 18. The retrieved instructions are sequentially communicated to the instruction decoder 22 for decoding under control of the global control circuit 18. The execution units 24 execute instructions and generate data that is either stored in a cache (not shown) or placed in the memory 30 via coupling through the global control circuit 18, the bus interface unit 14 and the global interconnect 12. Debugging of the operation of data processor 42 and data processing system 10 is performed by the use of debug circuitry 26 that generates debug messages for analysis by the external development system 36. A test or debug mode of operation is entered in response to activation of such from the external development system 36. In the illustrated form the debug circuitry 26 is configured to receive four different addresses which are either a data address or an instruction address. A data address is an address where data resides whereas an instruction address is an address where an instruction resides. Instruction untranslated addresses are provided from the instruction fetch unit 20 to the debug circuitry 26 and the address translation logic unit 16. An untranslated address is an address which requires some further processing or translating to obtain the address of the physical storage location where the information is residing. The address translation logic unit 16 provides instruction translated addresses to the debug circuitry 26 and bus interface unit 14. In one form the untranslated addresses may be logical addresses which are often also referred to as virtual addresses. In another form the untranslated addresses may be effective addresses. Effective addresses must first be translated into virtual addresses before being translated into physical addresses. The load/store unit 28 provides data untranslated addresses to the debug circuitry 26 and to the address translation logic unit 16. The address translation logic unit 16 provides data translated addresses to the debug circuitry 26 and bus interface unit 14. The address translation logic unit 16 operates under control of the global control circuit 18 to ensure that the debug circuitry 26 receives a translated address and an untranslated address associated with a same processor operation. In response to receiving the translated address and the untranslated address, a value of one or more control indicators or control bits is determined. Based on the value of the one or more control indicators, either the translated address or the untranslated address is chosen as a selected address. The debug circuitry then forms a debug message for the external development system 36 using at least a portion of the selected address by including a portion, if not all, of the selected address in the debug message. In one form the debug message is created by first compressing the selected address into a smaller sized selected address having fewer bits. At least a portion of the compressed selected address is then used as a portion of the debug message. The format of the debug message may vary and examples will discussed below in connection with FIGS. 5 and 6. In one form the debug message may include, in addition to at least a portion of the selected address, a field that indicates whether the selected address is the translated address or the untranslated address.

The control indicators will be described in below in connection with FIG. 2. In one form a software program contained in the user code 34 and library function code 32 of memory 30 is executed. The control indicator or indicators have values that are set based upon a type of the software program being debugged. For example, if the software program is a user program (user type), the control indicator assumes a first binary value. If the software program is a non-user program (non-user type), such as certain portions of library code or OS code, the control indicator assumes an opposite second binary value. In another form the one or more control indicators in the debug circuitry 26 include a first control bit that indicates whether translated or untranslated addresses are to be used for creating a program trace debug message and a second control bit that indicates whether translated addresses or untranslated addresses are to be used for creating a data trace debug message. Specific control indicators can also be associated with whether a program trace test function is being performed or whether a data trace test function is being performed.

Figure 2:
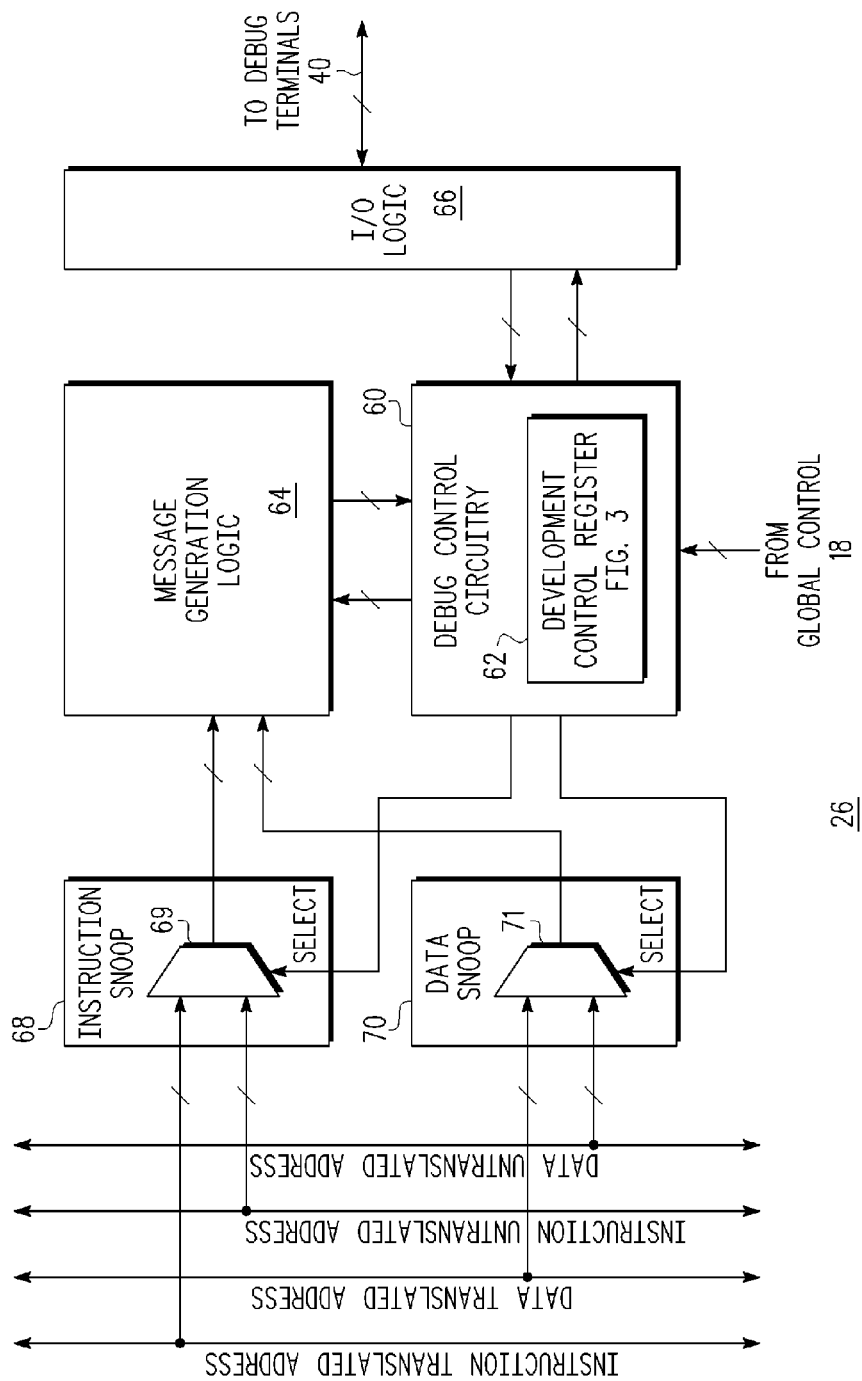
FIG. 2 illustrates in block diagram form one form of debug circuitry of FIG. 1.

Illustrated in FIG. 2 in an exemplary embodiment of a portion of the debug circuitry 26 of FIG. 1. Debug control circuitry 60 has an input/output terminal coupled to the global control circuit 18. Within the debug control circuitry 60 is a development control register 62. A first output of the debug control circuitry 60 is coupled to a first input of message generation logic 64 for generating a debug message. An output of the message generation logic 64 is coupled to a first input of the debug control circuitry 60. A second output of the debug control circuitry 60 is coupled to an input of Input/Output (I/O) logic 66. An input/output terminal of the I/O logic 66 is coupled via bidirectional multiple conductors to the debug terminals 40. An instruction snoop circuit 68 has a multiplexor 69 having a first input coupled to the instruction translated address of FIG. 1. A second input of multiplexor 69 is coupled to the instruction untranslated address of FIG. 1. An output of multiplexor 69 is coupled to a second input of the message generation logic 64. Multiplexor 69 has a control input for receiving a first Select signal from a third output of the debug control circuitry 60. A data snoop circuit 70 has a multiplexor 71 having a first input coupled to the data translated address of FIG. 1. A second input of multiplexor 71 is coupled to the data untranslated address of FIG. 1. An output of multiplexor 71 is coupled to a second input of the message generation logic 64. Multiplexor 71 has a control input for receiving a second Select signal from a fourth output of the debug control circuitry 60.

In operation, the message generation logic 64 is the logic circuitry which implements the function of forming the debug message pursuant to a selected one of a plurality of predetermined formats. The debug message is coupled to the debug control circuitry for routing to the debug terminals 40 via the I/O logic 66. Under control of the global control circuit 18, the debug control circuitry 60 also generates two select signals. A second select signal controls multiplexor 71 of the data snoop circuit 70 and functions to select one of the translated or the untranslated data address. In one form, the translated data address is a physical address of a data operand and the untranslated data address is a logical address of the data operand. A first select signal controls multiplexor 69 of the instruction snoop circuit 68 and functions to select one of the translated or the untranslated instruction address. In one form the translated instruction address is a physical address of an instruction operand and the untranslated instruction address is a logical address of the instruction operand. The debug control circuitry 60 uses one or more control indicators in the development control register 62 to decide whether to assert or negate the first select signal and the second select signal. In one form the one or more control indicators are implemented as control bits within the development control register 62. Both select signals may or may not be asserted at the same time and are independently controlled during the test or debug mode. The following figures will further describe the development control register 62 and the control indicator encodings as well as provide exemplary debug messages.

Illustrated in FIG. 3 is one example of a format of the development control register 62 of FIG. 2. The development control register 62 may be any bit size. In the illustrated form, a thirty-two bit implementation of the development control register 62 is provided. The bits zero through seventeen and bits twenty-one through twenty-nine are reserved. Bit eighteen is represented as a program trace address select (PTAS) control indicator or control bit. Bit nineteen is represented as a data trace address select (DTAS) control indicator or control bit. Bit twenty is represented as a characteristic indicator placement control (CIPC) control bit. Bits thirty and thirty-one are trace mode, TM, control bits and are encoded to control modes of debug operation. In particular, the trace mode control bits control whether tracing is enabled and whether the enabled tracing is for program tracing or data tracing or for both. The PTAS control bit determines whether untranslated addresses or translated addresses for program addresses are selected. Similarly, the DTAS control bit determines whether untranslated addresses or translated addresses for data addresses are selected. The CIPC control bit has a binary value that determines the location or placement in a debug message of an address type indicator. Examples of address type are whether the address is translated or untranslated, physical or virtual, etc. The CIPC control bit thus controls what bit position in a field of a debug message is used to identify the type of address that is contained in the debug message. The address may be either compressed using a compression algorithm or uncompressed. The digital value of these control bits is monitored by the debug control circuitry 60 and the appropriate select signals in FIG. 2 are either enabled or not enabled depending upon their digital values. It should be well understood that the positioning of bit fields within the development control register 62 is arbitrary and may vary. Additionally, the number of control bits within each control indicator field may differ between implementations.

Illustrated in FIG. 4 is a table that illustrates the encoding of the PTAS, DTAS, CIPC and TM fields in the development control register 62 of FIG. 3. When the PTAS control indicator bit of bit position eighteen in development control register 62 has a logic zero value the program trace messages, when enabled, provide logical address values. When the PTAS control indicator bit of bit position eighteen in development control register 62 has a logic one value the program trace messages, when enabled, provide physical address values. When the DTAS control indicator bit of bit position nineteen in development control register 62 has a logic zero value the data trace messages, when enabled, provide logical address values. When the DTAS control indicator bit of bit position nineteen in development control register 62 has a logic one value the program trace messages, when enabled, provide physical address values. When the CIPC characteristic indicator control bit in bit position twenty of development control register 62 has a logic zero value the address type characteristic indicator is provided as bit 33 of compressed or uncompressed address information. When the CIPC characteristic indicator control bit in bit position twenty of development control register 62 has a logic one value the address type characteristic indicator is provided as bit 24 of compressed or uncompressed address information. The table in FIG. 4 also illustrates an encoding for the trace mode control field. When the two TM control indicator bits have a value of "00" no tracing is enabled. When the two TM control indicator bits have a value of "1X", program tracing is enabled wherein "X" is a 'does not matter' value. In other words, regardless of the value of the right-most bit, the program tracing function is enabled when the left-most bit has a logic one value. When the two TM control indicator bits have a value of "X1", data tracing is enabled. In other words, regardless of the value of the left-most bit, the data tracing function is enabled when the right-most bit has a logic one value. When both control indicator bits of the TM field are a logic one, both the data tracing function and the program tracing function are enabled. It should be understood that the illustrated encoding values are exemplary only and differing encodings may be implemented such as by reversing the binary representations. The selected bit positions for the characteristic indicator placement may be at bit positions in the address information of an address field of a trace message other than the illustrated bit positions twenty-four and thirty-three.

Figure 5:
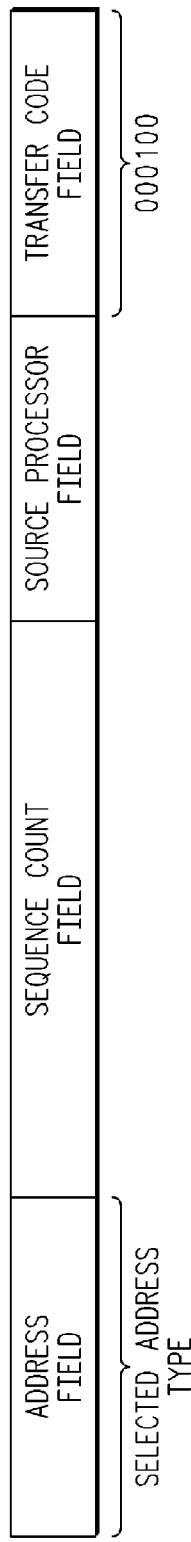
FIG. 5 illustrates in diagram form an exemplary program trace message.

Illustrated in FIG. 5 is a first exemplary trace message 80. The trace message 80 has four illustrated fields. The positioning of the fields is arbitrary. An address field contains the address of the trace message 80. The type of address in this address field is the type that was selected. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies the trace message 80 as a program trace message having a particular predetermined field format. In the example of FIG. 5, the value that represents a program trace message with the illustrated form is "000100". The address field also contains the selected address type of the address being messaged. In other words the address field also identifies whether the address field contains an address that is a virtual address or a physical address. This information, an address type characteristic indicator, when included within the debug message, provides the trace reconstruction debug tool with the knowledge of the type of address being presented, and may optionally imply whether a trace listing should be generated.

Figure 6:
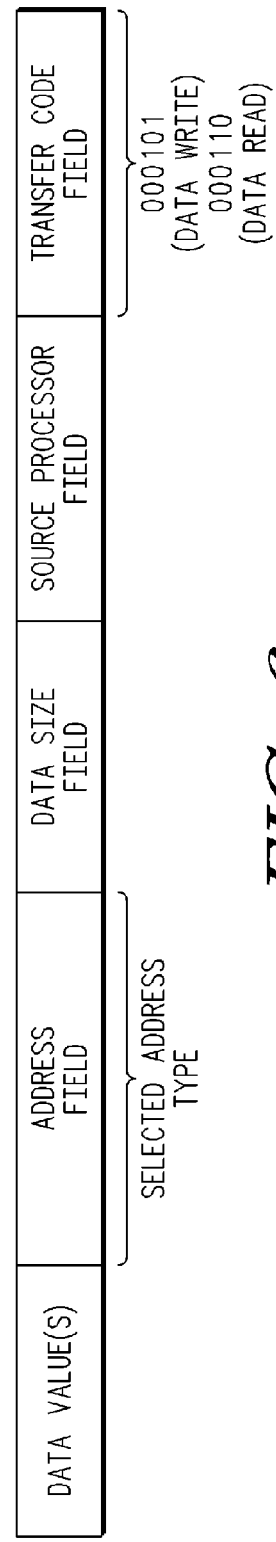
FIG. 6 illustrates in diagram form an exemplary data trace message.

Illustrated in FIG. 6 is another exemplary trace message 82. The trace message 82 has five illustrated fields. The positioning of the fields is arbitrary. A data value(s) field contains one or more data values associated with trace message 82. An address field contains the address of the trace message 82. The selected address type is also contained in this address field as an address type characteristic indicator. The address type characteristic indicator identifies whether the address field contains an address that is a virtual address or a physical address. A data size field contains a value that represents the length of the data or the number of bits contained in the data field. A source processor field contains a value that identifies what processor that the trace message 82 is associated with. This field information is valuable in multiple processor systems. A transfer code field contains a value that identifies the trace message 82 as a data trace message having a particular predetermined field format. In the example of FIG. 6, the value that represents a data write trace message with the illustrated form is "000101". The value that represents a data read trace message with the illustrated form is "000110". The positioning of the fields relative to each other and the bit size of each field are arbitrary and may vary between differing circuit design implementations.

Illustrated in FIG. 7 is a first example of how an address for a debug message is generated. Two addresses labeled A1 and A2 are provided. Assume that address A2 is a received address that is associated with a processor operation. Assume that address A1 is a previous address associated with a previous processor operation. The actual values of addresses A1 and A2 are exemplary only and it should be understood that any address value may be used. A modified address is created by performing a logic operation on addresses A1 and A2. The logic operation, in one embodiment, is an exclusive OR operation in which corresponding respective bit positions of address A1 and address A2 are exclusive ORed. The resulting modified address is illustrated in FIG. 7 in which twenty leading zeros are generated. The portion of the address from least significant bit to the most significant binary one bit is grouped as illustrated in FIG. 7 and this grouping forms a modified address M1 which is used as the address in the debug message resulting in a smaller average message size for many messages. Redundant information which can be recreated from a previously sent message address is removed. Conversely, the address A2 may be re-created from the debug message address by a debugger as follows. Previous address A1 is exclusive-ORed with the address message M1. The address message M1 is expanded back to a thirty-two bit format by adding the required leading edge zeros in front of the address message M1. The exclusive OR operation results in the address A2. Thus FIG. 7 illustrates how translating from an address to a debug message address and vice versa is implemented. Note that the modified address M1 sent in the first trace message when debugging is first enabled contains a full address with leading zeros removed. The debugger can assume a previous address value of all zeros as an initial address for the basis of expanding the modified address M1 to a full address for the message.

Illustrated in FIG. 8 is an example of address generation for a debug message using predetermined characteristic indicators. In this example assume that the characteristic indicator placement control (CIPC) control bit is a logic zero. A previous extended address A1 associated with a previous processor operation is illustrated with the hexadecimal value of 0x00003FC00. A subsequent extended address associated with a processor operation is illustrated with the hexadecimal value of 0X10003F365. The original 32-bit address values have been extended to 33 bits by the addition of a characteristic indicator as a $33^{rd}$ bit. The two addresses are also provided in binary representation in a debug message generation section of FIG. 8, but in a modified form. It should be noted that in each address the least significant bit, bit zero, is an indicator bit that specifies an instruction set architecture (ISA) type rather than the original address bit 0 of the address. Certain processors are capable of executing instructions form one or more instruction sets. Knowledge of the currently executing instruction set is often useful or is required information for proper operation of the external debugger in interpreting debug messages and other activity. For many of these instructions though, an address pointer to an instruction is aligned to a minimum of a 16-bit boundary, thus the lowest order address bit is not used, and is assumed to be zero. The bit zero of each address is thus used as an ISA-type characteristic indicator rather than an actual address bit known to be zero. The binary value associated with this bit indicates the instruction set architecture associated with the address. For example, one encoding may be designated to indicate a single instruction, multiple data (SIMD) instruction set. An alternate encoding may be used to indicate a variable-length instruction set. Also included within each of extended address A1 and A2 are address-type characteristic indicators selected to be placed in the least significant bit of the most significant hexadecimal nibble position of addresses A1 and A2, which is bit position thirty-three as a result of bit CIPC being logic zero. Thus, each address contains two characteristic indicators located at two predetermined bit positions. A modified address is generated by performing an exclusive OR operation on extended addresses A1 and A2 to create the illustrated modified address. An address message (M1) is then created from the modified address. Because the most significant bit of the modified address is a leading one binary value, due to a change in the characteristic indicator, all of the bits in the original address are used to form the modified address for the address value sent in the debug message. The message length for the address field in this example is therefore thirty-three bits. The modified address is generated by extending address A2 to include a characteristic indicator or annotation in the form of the thirty-third address bit position. This bit position indicates that the address is of a first predetermined type, such as a physical address. The value of the CIPC bit in development control register 62 of FIG. 3 and its associated encoding in FIG. 4 determines the bit position within the modified address for the characteristic indicator. If the CIPC bit is a logic one the characteristic indicator is the leading or most significant bit (bit thirty-three). A debug message is created having a format such as that of FIG. 5 or FIG. 6 using the M1 address message in the address field of the debug message. By placing the characteristic indicator as the most significant bit location of the extended addresses, the normal process of forming a modified address by exclusive ORing of the previous extended address (which had a first characteristic indicator value) with the current extended address (having an opposite value for the characteristic indicator) causes the entire address value to be sent. The sending of the entire address value when the characteristic indicator changes state is useful for debugging, since the addresses are of two different types, and thus may not have the same relationship as is normally assumed in receiving modified address values such as M1 in a debug message. By placing the characteristic indicator as the most significant bit of the extended address, modified address information obtained by the exclusive OR operation will contain all address bits.

The designated bit position of the characteristic indicator within the address is predetermined and depends in part upon the amount of relevant address information desired for a particular characteristic indicator. For example, in FIG. 8 a full message length of 33 bits results when the characteristic indicator is placed in the MSB position of the address and it has a change in value from the previous address sent in a message. A same encoding for two successive addresses will result in a shorter or compressed address since no change in the characteristic indicator has occurred, and thus the most significant "1" bit in the modified address will be a lower order bit. Thus the address-type characteristic indicator permits a user to controllably select the size of the address field in the debug message. The debug message length may be reduced for a first type of addresses and expanded to a predetermined maximum length for a second type of addresses or when a change in address type occurs. Also, when the ISA-type characteristic indicator is positioned in an upper portion of the address rather than the LSB, the maximum message length can be affected. Thus when the characteristic indicator is of the address-type the address has a different maximum length than when the characteristic indicator is an ISA-type. When transitioning between data processing instruction types, the low order bit or bits of an address may be sufficient and used in order to restrict message lengths with a desired encoding of an address-type characteristic indicator. When transitioning between logical and physical addresses, the MSB of the address-type characteristic indicator may be used to generate a full length message which includes the entire address in order to provide a known synchronization point in the instruction flow.

By placing the characteristic indicator (i.e. annotation information) in a selected bit position, the same trace logic for determining the amount of address information to provide for the debug message may be used and controlled to provide the desired amount of information. When multiple characteristic indicators are used in an address, any one of the characteristic indicators may be selected for the same information to optimize the amount of address information used in the address field of the debug message. It should be noted that whatever address compression algorithm or method is used in the FIG. 8 example continues to operate unaffected. Since the compression algorithm illustrated in FIG. 8 does not truncate any leading ones, then all thirty-three bits are provided in the address message.

The address re-creation of address A2 in FIG. 8 is implemented by performing an exclusive OR operation of previous address A1 and the address message M1. The exclusive OR operation results in the original A2 address along with the characteristic indicator in the $33^{rd}$ bit position. Thus the address A2 has been modified or annotated real-time for debug purposes to create debug trace messages such as program trace or data trace messages containing compressed address fields with embedded characteristic indicators.

Illustrated in FIG. 9 is another example of address generation for a debug message using predetermined characteristic indicators. In this example the characteristic indicator placement control (CIPC) control bit is a logic one. Therefore, according to the embodiment illustrated in FIG. 4, the bit position of the address-type characteristic indicator is at bit position twenty-four of the address having bits 0 through 32 and the ISA-type characteristic indicator is the LSB. Within address A2, the address-type characteristic bit is encoded as a logic one which will expand the address length at least to bit position twenty-four. When a modified address is formed from addresses A1 and A2, the resulting leading one of the modified address is at bit position twenty-four which means the modified address is twenty-five total bits (bits 0-24). An address compression algorithm may be implemented to reduce the size of the full address message generated when the characteristic indicator changes. The size in this example is reduced to twenty-five total bits with the address-type indicator being the MSB. The address may be re-created by forming the exclusive OR of address A1 and the address message M1 with eight extended zeros added in front of the twenty-five bits. The correct full size original address A2 is then recreated. The selective positioning of the characteristic indicator may be user controlled, based on the desired amount of full address information when a change in the value of an address-type characteristic indicator changes state. The control register of FIG. 4 may be written to by the user of data processing system 10 to alter the position of the characteristic indicator to cause full addresses to be sent as the message address for a debug message to assume one or more predetermined lengths. The selection by the user may be based on the range of memory being debugged, the amount of address space consumed by addressable memory within data processing system 10, or on other relevant criteria. Similarly, the bit positions selected by CIPC control bit values may be other predetermined useful values other than 33 and 24. In some embodiments, the CIPC control bit field within the development control register 62 may implement more than two possible selection positions for the placement of a given characteristic indicator. In addition, in some embodiments, there may be multiple CIPC control bit fields, each corresponding to a unique characteristic indicator value in the debugging of data processing system 10.

By now it should be appreciated that there has been provided a data processing system having efficient real-time debug addressing. Currently implemented debug systems implementing the Nexus ISTO-5001 standard typically transfer all address information as virtual addresses. When listings are unavailable for translation to a physical address the system performance or debug capability previously was degraded. The control indicators provided herein in development control register 62 permits a user of an external debugger to specify the type of addresses to be messaged. Therefore program trace reconstruction can be effectively used to debug various types of environment regardless of the availability of program listings. The debugger may perform proper run-time profiling and performance analysis of specific library or OS functions and allow a user the ability to determine whether alternate optimizations should be performed. The programmable control indicators permit the debugger to obtain addresses of a format suitable for a specific debug task and in real-time. While the debug circuitry 26 receives both translated and untranslated addresses, the programmed control indicators permits the debug circuitry 26 to select which address is to be used in generating a debug trace message. Additionally, independent control of the address format exists for program debug tracing and data debug tracing. By positioning one or more characteristic indicators in a predetermined bit position, normal compression logic may be employed to reduce message length for a first class of information types, and to expand the debug message length for a second class of information types. For example, low order characteristic indicators may be used to restrict message lengths since no relevant additional information may be desired. A most significant bit characteristic indicator may be used to force compression logic to generate a full length debug message in order to provide a known synchronization point. Intermediate positions for characteristic indicators may be useful to minimize the length of full length addresses sent in a debug message.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one form there is herein provided a method for generating a debug message in a data processing system. An address associated with a processor operation is received. A modified address is generated by modifying the address to include a characteristic indicator within the address at a first predetermined bit position when the characteristic indicator is of a first type or at a second predetermined bit position, different from the first predetermined bit position, when the characteristic indicator is of a second type. The characteristic indicator has a first value which indicates a characteristic of the address. Address information is generated from the modified address. A debug message is created which includes the address information. In one form, to generate the address information a previous address associated with a previous processor operation is modified to include the characteristic indicator at a same predetermined bit position as in the modified address to generate a modified previous address. The characteristic indicator has a second value which indicates a characteristic of the previous address. The modified previous address and the modified address are used to generate the address information. In another form when the first value is the same as the second value, the address information has a first length, and when the first value is different from the second value, the address information has a second length, different from the first length. In another form the modified previous address and the modified address are used to generate the address information by exclusive ORing the modified previous address and the modified address to generate the address information. In another form when the characteristic indicator is of the first type, the characteristic indicator indicates an instruction type associated with the address and when the characteristic indicator is of the second type, the characteristic indicator indicates an address type of the address. In another form the second predetermined bit position is a higher order bit position as compared to the first predetermined bit position. In another form when the characteristic indicator is of the second type, the first value of the characteristic indicator indicates whether the address is a logical or physical address. In yet another form when the characteristic indicator is of the first type, the address information has a different maximum length than when the characteristic indicator is of the second type.

In yet another form there is provided a method for generating a debug message in a data processing system. An address associated with a processor operation is received. A value of a position indicator is determined. A value of a characteristic indicator is determined, wherein the value indicates a characteristic of the address. When the position indicator has a first value, the address is modified to include the characteristic indicator at a first predetermined bit position within the address to generate a modified address. When the position indicator has a second value, the address is modified to include the characteristic indicator at a second predetermined bit position with the address, different from the first predetermined position, to generate the modified address. Address information is generated from the modified address. A debug message is created which includes the address information. In another form generating the address information is done by modifying a previous address associated with a previous processor operation to include the characteristic indicator at a same predetermined bit position as in the modified address to generate a modified previous address. The characteristic indicator has a second value which indicates a characteristic of the previous address. The modified previous address and the modified address are used to generate the address information. In another form when the first value is the same as the second value, the address information has a first length, and when the first value is different from the second value, the address information has a second length, different from the first length. In another form the using the modified previous address and the modified address to generate the address information is done by exclusive ORing the modified previous address and the modified address to generate the address information. In yet another form the characteristic indicator indicates an address type of the address. In yet another form the value of the characteristic indicator indicates whether the address is a logical address or a physical address. In yet another form the first predetermined bit position is a higher order bit position as compared to the second predetermined bit position. In yet another form neither the first predetermined bit position nor the second predetermined bit position is a least significant bit position of the address.

There is herein provided a data processing system having processing circuitry which performs processor operations. Debug circuitry is coupled to receive addresses from the processing circuitry associated with the processor operations and to provide debug messages using the addresses. The debug circuitry has storage circuitry which stores a position indicator. Message generation logic modifies the addresses by including a characteristic indicator to generate modified addresses, wherein the characteristic indicator is placed at a first predetermined bit position of an address when the position indicator has a first value and the characteristic indicator is placed at a second predetermined bit position of the address when the position indicator has a second value, the message generation logic using the modified addresses to create debug messages which include address information. The message generation logic creates each debug message by generating the address information from a previous modified address and a current modified address. In one form the debug circuitry receives translated addresses and untranslated address from the processing circuitry, and the characteristic indicator indicates whether the message generation logic generated the address information using a translated address or an untranslated address. In yet another form the first predetermined bit position is a higher order bit position as compared to the second predetermined bit position.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Computer readable media used to implement the described structure and functions may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, various characteristic indicators may be used to indicate instruction class information, instruction mode information, address type information, page crossing information and user controlled indicators that are based on any matching or triggering mechanism. Various type of memory circuits may be used to implement the cache and various register storage devices may be used to implement the described FIFOs. Other storage devices in addition to a FIFO may be used. For example, in some protocols a single, register storage could be implemented. In other embodiments a LIFO, last-in first-out storage device could be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a debug message in a data processing system, the method comprising:
   receiving an address associated with a processor operation;
   generating a modified address by modifying the address to include a characteristic indicator within the address at a first predetermined bit position when the characteristic indicator is of a first type or at a second predetermined bit position, different from the first predetermined bit position, when the characteristic indicator is of a second type, the characteristic indicator having a first value which indicates a characteristic of the address;
generating address information from the modified address; and
creating a debug message which includes the address information.

2. The method of claim 1, wherein the generating the address information comprises:
modifying a previous address associated with a previous processor operation to include the characteristic indicator at a same predetermined bit position as in the modified address to generate a modified previous address, the characteristic indicator having a second value which indicates a characteristic of the previous address; and
using the modified previous address and the modified address to generate the address information.

3. The method of claim 2, wherein when the first value has a same value as the second value, the address information has a first length, and when the first value has a different value from the second value, the address information has a second length, different from the first length.

4. The method of claim 2, wherein the using the modified previous address and the modified address to generate the address information comprises:
exclusive ORing the modified previous address and the modified address to generate the address information.

5. The method of claim 1, wherein when the characteristic indicator is of the first type, the characteristic indicator indicates an instruction type associated with the address and when the characteristic indicator is of the second type, the characteristic indicator indicates an address type of the address.

6. The method of claim 5, wherein the second predetermined bit position is a higher order bit position as compared to the first predetermined bit position.

7. The method of claim 5, wherein when the characteristic indicator is of the second type, the first value of the characteristic indicator indicates whether the address is a logical or physical address.

8. The method of claim 1, wherein when the characteristic indicator is of the first type, the address information has a different maximum length than when the characteristic indicator is of the second type.

9. A method for generating a debug message in a data processing system, the method comprising:
receiving an address associated with a processor operation;
determining a value of a position indicator;
determining a value of a characteristic indicator, wherein the value indicates a characteristic of the address;
when the position indicator has a first value, modifying the address to include the characteristic indicator at a first predetermined bit position within the address to generate a modified address;
when the position indicator has a second value, modifying the address to include the characteristic indicator at a second predetermined bit position with the address, different from the first predetermined bit position, to generate the modified address;
generating address information from the modified address; and
creating a debug message which includes the address information.

10. The method of claim 9, wherein the generating the address information comprises:
modifying a previous address associated with a previous processor operation to include the characteristic indicator at a same predetermined bit position as in the modified address to generate a modified previous address, the characteristic indicator having a second value which indicates a characteristic of the previous address; and
using the modified previous address and the modified address to generate the address information.

11. The method of claim 10, wherein when the first value has a same value as the second value, the address information has a first length, and when the first value has a different value from the second value, the address information has a second length, different from the first length.

12. The method of claim 10, wherein the using the modified previous address and the modified address to generate the address information comprises:
exclusive ORing the modified previous address and the modified address to generate the address information.

13. The method of claim 9, wherein the characteristic indicator indicates an address type of the address.

14. The method of claim 13, wherein the value of the characteristic indicator indicates whether the address is a logical address or a physical address.

15. The method of claim 13, wherein the first predetermined bit position is a higher order bit position as compared to the second predetermined bit position.

16. The method of claim 9, wherein neither the first predetermined bit position nor the second predetermined bit position is a least significant bit position of the address.

17. A data processing system, comprising:
processing circuitry which performs processor operations; and
debug circuitry coupled to receive addresses from the processing circuitry associated with the processor operations and to provide debug messages using the addresses, wherein the debug circuitry comprises:
storage circuitry which stores a position indicator; and
message generation logic which modifies the addresses by including a characteristic indicator to generate modified addresses, wherein the characteristic indicator is placed at a first predetermined bit position of an address when the position indicator has a first value and the characteristic indicator is placed at a second predetermined bit position of the address when the position indicator has a second value, the message generation logic using the modified addresses to create debug messages which include address information.

18. The data processing system of claim 17, wherein the message generation logic creates each of the debug messages by generating the address information from a previous modified address and a current modified address.

19. The data processing system of claim 18, wherein the debug circuitry receives translated addresses and untranslated address from the processing circuitry, and wherein the characteristic indicator indicates whether the message generation logic generated the address information using a translated address or an untranslated address.

20. The data processing system of claim 17, wherein the first predetermined bit position is a higher order bit position as compared to the second predetermined bit position.

* * * * *